United States Patent
Matsuno

(10) Patent No.: US 8,992,671 B2
(45) Date of Patent: Mar. 31, 2015

(54) MACHINING METHOD FOR WORKPIECE USING A MACHINING DEVICE WITH WASTE COLLECTION EQUIPMENT

(75) Inventor: Takemi Matsuno, Yokohama (JP)

(73) Assignee: Nakata Coating Co., Ltd., Yokohama-shi, Kanagawa (JP)

( * ) Notice: Subject to any disclaimer, the term of this patent is extended or adjusted under 35 U.S.C. 154(b) by 1065 days.

(21) Appl. No.: 12/737,866

(22) PCT Filed: Dec. 8, 2010

(86) PCT No.: PCT/JP2010/072022
§ 371 (c)(1),
(2), (4) Date: Feb. 24, 2011

(87) PCT Pub. No.: WO2011/121853
PCT Pub. Date: Oct. 6, 2011

(65) Prior Publication Data
US 2012/0055336 A1  Mar. 8, 2012

(30) Foreign Application Priority Data
Mar. 31, 2010 (JP) .................. 2010-081512

(51) Int. Cl.
*B01D 47/06* (2006.01)
*B23Q 11/00* (2006.01)

(52) U.S. Cl.
CPC .......... *B23Q 11/005* (2013.01); *B23Q 11/0057* (2013.01)
USPC ........................................................ 95/219

(58) Field of Classification Search
None
See application file for complete search history.

(56) References Cited

U.S. PATENT DOCUMENTS

| 3,963,461 A * | 6/1976 | Stockford et al. ............. 95/10 |
| 2006/0110228 A1 | 5/2006 | Hansson et al. |
| 2007/0051245 A1 * | 3/2007 | Yun ............................. 96/281 |

FOREIGN PATENT DOCUMENTS

| DE | 10 2008 027 670 A1 | 12/2009 |
| JP | 55-072398 | 5/1980 |
| JP | 61-071333 | 5/1986 |
| JP | H07-016499 | 1/1995 |
| JP | 3029831 | 10/1996 |

(Continued)

OTHER PUBLICATIONS

Europe Patent Office, Office Action for EP 10807688.6, Apr. 30, 2014.

(Continued)

*Primary Examiner* — Duane Smith
*Assistant Examiner* — Pankti Patel
(74) *Attorney, Agent, or Firm* — Manabu Kanesaka

(57) ABSTRACT

This invention provides a machining device with waste collection equipment, which is suitable for collecting an easily charged waste and the like, and a machining method using the machining device. In the machining device with waste collection equipment, which collects waste generated by a predetermined machining processing, the waste collection equipment is provided with a transfer path through which the waste is transferred using an air flow, a water supply device which is provided at an intermediate portion of the transfer path and supplies a predetermined amount of water to the waste thereby applying antistatic treatment to the waste, a cyclone which applies separation processing to the waste subjected to the antistatic treatment, and a collection tank which collects the waste subjected to the separation processing by the cyclone.

7 Claims, 10 Drawing Sheets

(56) References Cited

FOREIGN PATENT DOCUMENTS

| JP | 2000-140547 | 5/2000 |
|----|-------------|--------|
| JP | 2004-306212 | 11/2004 |
| JP | 2005-205700 | 8/2005 |
| JP | 2006-123049 | 5/2006 |
| JP | 4382429 | 12/2009 |
| WO | 00/73017 A1 | 12/2000 |

OTHER PUBLICATIONS

European Patent Office, Extended European Search Report for EP 10807688.6, May 16, 2013.

* cited by examiner

MACHINING METHOD FOR WORKPIECE USING A MACHINING DEVICE WITH WASTE COLLECTION EQUIPMENT

RELATED APPLICATIONS

The present application is National Phase of International Application No. PCT/JP2010/072022 filed Dec. 8, 2010, and claims priority from Japanese Application No. 2010-081512, filed Mar. 31, 2010, the disclosure of which is hereby incorporated by reference herein in its entirety.

BACKGROUND OF THE INVENTION

1. Field of the Invention

This invention relates to a machining device with waste collection equipment and a machining method for a workpiece using the machining device, and relates particularly to a machining device with waste collection equipment, which is suitable for collecting waste constituted of an easily charged synthetic resin or a metal powder, for example, and a machining method for a workpiece using the machining device.

2. Description of the Related Art

In the related art, there is proposed, as a kind of a machining device, an airbag tear line forming device for forming an airbag tear line, which is fractured within a short time with high accuracy when an airbag is deployed (see, Patent Document 1).

More specifically, as shown in FIG. 7, such an airbag tear line forming device 200 is provided with a tear line forming receiving table on which an outer skin 220 forming a tear line 220a is set, a cutting tool 210 including a spindle 209 for forming the tear line 220a, a vertical moving plate 207 including a solenoid 208 for reciprocating the cutting tool 210 by a predetermined distance (0.5 to 3 mm) through a sliding mechanism 206, and a working block 205 allowing the vertical moving plate 207 to move in three orthogonal axis directions.

Meanwhile, at medical sites including dental treatment, for example, in order to easily and reliably remove ultrafine dust (with an average diameter of 0.1 to 0.3 μm) contained in air, there is proposed dust collection and air purification equipment which previously mixes atomized water and dust, and thereafter, in a dust collection tank, removes the dust by a cyclonic flow (see, Patent Document 2).

More specifically, there is proposed dust collection and air purification equipment 301 as shown in FIG. 8. The dust collection and air purification equipment 301 is provided with an induction pipe 303 for taking in air, a venturi portion 331, and a dust collection tank 302 utilizing the cyclonic flow. The dust collection and air purification equipment 301 is characterized as follows. Namely, in the venturi portion 331, the induction pipe 303 connecting to a water introduction pipe 332 is connected to the dust collection tank 302. While an upper portion of the dust collection tank 302 has a discharge pipe 304 for discharging air to an external device 341, a lower portion of the dust collection tank 302 has a water storage tank 321 for storing dust. A part of water in the water storage tank 321 is taken from a water intake opening 322 through a pump to be supplied to the venturi portion 331.

Likewise, there is proposed a dust collection device which is used for a clean room, for example, and can remove even fine particles with a grain diameter of 0.1 μm or less which cannot be collected by a normal cyclone collector (see, Patent Document 3).

More specifically, there is proposed a dust collection device 410 as shown in FIG. 9. In the dust collection device 410, a gas in which dust is to be collected is introduced as shown by an arrow 413A. In water vapor supply means 414, while water vapor 414C is mixed with the gas, the mixture is introduced into a cyclone 417. In the cyclone 417, particles are removed from the gas, utilizing centrifugal force acting on the particles in the gas. The dust collection device 410 is characterized by including the water vapor supply means 414 for supplying the water vapor 414C to the gas and a cooling means 416 provided on the downstream side of the water vapor supply means 414 for cooling the gas supplied with water vapor by the water vapor supply means 414.

There is further proposed a dust collection attachment for use in reliably collecting dust, generated in cutting, at low cost (see, Patent Document 4).

More specifically, there is proposed a dust collection attachment 501 as shown in FIG. 10. The dust collection attachment 501 is characterized as follows. Namely, the dust collection attachment 501 has a plurality of bellows portions 502b and 502d. In addition, a tubular cover portion 502 surrounding a hammer 510b of a chipping hammer 510 for becoming a negative pressure by air suction and an intake pipe portion 503 for sucking the inside of the cover portion 502 and collecting dust are connected between the plurality of bellows portions 502b and 502d.

RELATED ART DOCUMENTS

Patent Documents

[Patent Document 1] JP4382429B (for example, Scope of Claims and FIG. 4)
[Patent Document 2] JP2000140547A (for example, Scope of Claims and FIG. 1)
[Patent Document 3] JP716499A (for example, Scope of Claims and FIG. 1)
[Patent Document 4] JP2004306212A (for example, Scope of Claims and FIG. 2)

However, the airbag tear line forming device 200 described in the Patent Document 1 is provided with no device for collecting waste generated by cutting processing. Therefore, since waste remaining on a formed tear line becomes an obstacle, there is a problem that it is difficult to accurately measure a depth of the tear line (fracture groove) using an optical measurement device such as a laser displacement gauge. Especially, because of the influence of waste generated in large numbers, it is practically difficult to measure the depth of the tear line quickly and highly accurately while the cutting processing is performed and at the same time, adjust the cutting state with which the value of the depth of the tear line is fed back.

The airbag tear line forming device 200 described in the Patent Document 1 is provided with the solenoid 208 for reciprocating the cutting tool by a predetermined distance (approximately 0.5 to 3 mm). Therefore, linear cut portions can be provided intermittently; however, when the linear cut portions are continuously formed, there is a problem that it takes a long time and the manufacturing cost is increased.

Meanwhile, the dust collection and air purification equipment 301 described in the Patent Document 2 is characterized in that because of its structure, the water storage tank is provided in the lower portion of the dust collection tank so that ultrafine dust is collected as sludge. Thus, there is a problem that a subsequent treatment method and handling become difficult, and, in addition, the entire device is likely increased in size and complicated.

Further, the dust collection and air purification equipment 301 described in the Patent Document 2 is intended to collect only ultrafine dust (with an average diameter of 0.1 to 0.3 μm) generated when teeth is cut, for example, but is not intended to simply and efficiently collect waste generated in large numbers by a machining device, easily charged, and having a considerably large size.

In the dust collection device 410 described in the Patent Document 3, because of its structure, not only the water vapor supply means 414 but also the cooling means 416 for condensing water vapor are required to be provided, and thus there is a problem that the running cost is increased, and it is economically disadvantaged.

Further, the dust collection device 410 described in the Patent Document 3 is intended to collect only ultrafine particles (with a grain diameter of 0.1 μm or less) which become a problem in the clean room, but is not intended to simply and efficiently collect waste generated in large numbers by a machining device, easily charged, and having a considerably large size.

The dust collection attachment 501 described in the Patent Document 4 is intended to collect dust generated by the hummer 510b which is a machining device but a predetermined antistatic treatment is not considered therefor. Accordingly, even if a cyclone, a collection tank, and so on are provided, static electricity is generated, and dust cannot be collected efficiently.

Especially, in the dry season of winter, a large amount of generated dust adheres to an inner wall of the cyclone and an inner wall of the collection tank, and it is difficult to efficiently remove dust outside.

In addition, the entire tubular cover portion 502 surrounding the hummer 510b has rubber bellows portions 502b and 502d, and thus the cover portion 502 is easily deformed in not only the vertical direction but also the lateral direction, so that the cover portion 502 is easily in contact with the hummer 510b. Consequently, there is a problem that it is difficult to perform machining processing with high accuracy.

SUMMARY OF THE INVENTION

Thus, according to the intensive studies of the present inventors, a predetermined machining device is provided with waste collection equipment for collecting waste generated in large numbers by machining processing, easily charged, and having a considerably large size while applying a predetermined antistatic treatment to the waste, whereby even in the dry season like winter season when static electricity is likely generated, waste can be collected efficiently, and, at the same time, a machining state of a workpiece in the machining processing can be managed with high accuracy, so that the present invention has been completed.

Namely, an object of this invention is to provide a machining device, which has high machining accuracy with respect to a workpiece, and, in addition, efficiently collects waste which is generated by machining processing and is easily charged, and a machining method for a workpiece using the machining device.

According to the present invention, there is provided a machining device with waste collection equipment, which collects waste generated by a predetermined machining processing, the waste collection equipment including: a transfer path through which the waste is transferred using an air flow; a water supply device which is provided at an intermediate portion of the transfer path and supplies a predetermined amount of water to the waste thereby applying antistatic treatment to the waste; a cyclone which applies separation processing to the waste subjected to the antistatic treatment; and a collection tank which collects the waste, subjected to the separation processing, by the cyclone, and the above problems can be solved.

Namely, by virtue of the provision of the waste collection equipment for applying a predetermined antistatic treatment to waste generated in large numbers by machining processing, easily charged, and having a considerably large size so as to collect the waste as easily handled waste, the waste can be efficiently collected in the collection tank through the cyclone.

According to the machining device, since the generated waste can be suctioned and removed quickly, a machining state of a workpiece in the machining processing can be managed with high accuracy by using an optical measurement device and so on, avoiding measurement obstacles caused by waste.

Further, in the configuration of the machining device with waste collection equipment according to the present invention, it is preferable that the water supply device is constituted of a venturi pipe and a water introduction pipe supplying water into the venturi pipe and supplies a predetermined amount of water through the water introduction pipe, utilizing a negative pressure generated when the air flow passes through the venturi pipe.

According to the above constitution, a water supply device can have a simple and small constitution. Moreover, since water in a mist state can be supplied to waste, antistatic treatment can be efficiently applied to the waste with a relatively small amount of water.

Further, in the configuration of the machining device with waste collection equipment according to the present invention, it is preferable that an electromagnetic valve or a manual valve is provided at an intermediate portion of the water introduction pipe.

By virtue of the provision of the electromagnetic valve or the like, the water supply amount in the water supply device can be more finely adjusted, and therefore, the antistatic treatment can be more efficiently applied to waste with a relatively small amount of water.

Further, by virtue of the provision of the electromagnetic valve or the like, a predetermined amount of water can be stored in the water introduction pipe between the valve and the water supply device, and therefore, a predetermined antistatic treatment can be quickly applied to waste, utilizing the water.

Further, in the configuration of the machining device with waste collection equipment according to the present invention, it is preferable that the machining device is a cutting device or a polishing device, and after waste generated by the cutting device or the polishing device is subjected to the separation processing in the cyclone, the waste is collected in the collection tank.

According to the above constitution, the antistatic treatment can be efficiently applied to even waste such as a cutting powder, which is generated in large numbers in the cutting device and so on, is easily charged, and has a relatively large size, and the waste can be efficiently collected in the collection tank through the cyclone.

In a case of the cutting device and so on, it is important to grasp a machining processing state in a workpiece. Since waste is quickly suctioned and removed, the machining processing state can be measured with high accuracy by an optical measurement device and so on and can be adjusted.

Further, in the configuration of the machining device with waste collection equipment according to the present invention, it is preferable that the collection tank comprises a transparent window portion, and a waste collection state can be visually confirmed.

According to the above constitution, a waste collection level in the collection tank can be confirmed visually, and an antistatic state of waste and a waste collection period can be easily judged.

Further, in the configuration of the machining device with waste collection equipment according to the present invention, it is preferable that when the collection tank is a first collection part, a second collection part for collecting the waste is provided under the first collection part through a shutter, and when the shutter is opened, waste dropped by its own weight is integrally collected in the second collection part.

According to the above constitution, even in a simple constitution, a predetermined amount of waste can be collected integrally and quickly.

Another aspect of this invention provides a machining method for a workpiece using a machining device with waste collection equipment. The machining method is characterized by including the following processes (1) to (5):
(1) a process of applying machining processing to the workpiece while suctioning and removing the waste by using the machining device;
(2) a transfer process of transferring the waste in a transfer path, using an air flow;
(3) an antistatic treatment process of supplying a predetermined amount of water to the waste by a water supply device provided at an intermediate portion of the transfer path;
(4) a separation processing process of applying separation processing to the waste, subjected to antistatic treatment, by means of a cyclone; and
(5) a process of collecting waste, subjected to separation processing by the cyclone, by the collection tank.

Namely, according to the machining method, even waste generated in large numbers in a predetermined machining device, easily charged, and having a considerably large size can be efficiently collected as easily handled waste in the collection tank through the cyclone.

Meanwhile, since the waste can be quickly and satisfactorily absorbed while the machining processing is performed, measurement obstacles caused by remaining waste are eliminated, and the machining state of a workpiece (such as a machining depth) can be measured with high accuracy using an optical measurement device and so on and can be adjusted.

Further, when the machining method for a workpiece according to the present invention is implemented, it is preferable that a volume resistance before the antistatic treatment in the waste is $1 \times 10^8$ Ω·cm or more, and the volume resistance after the antistatic treatment in the waste is $1 \times 10^6$ Ω·cm or less.

According to the machining method, the amount of water supplied to waste and the level of the antistatic treatment can be managed quantitatively.

The volume resistance of waste can be measured using a digital volt meter under a predetermined condition (electrode of 1 cm$^2$, voltage of 100 V, and resistance value conversion after application of voltage for 30 seconds) according to a four-terminal method.

DETAILED DESCRIPTION OF THE EMBODIMENTS

First Embodiment

Figure 1:
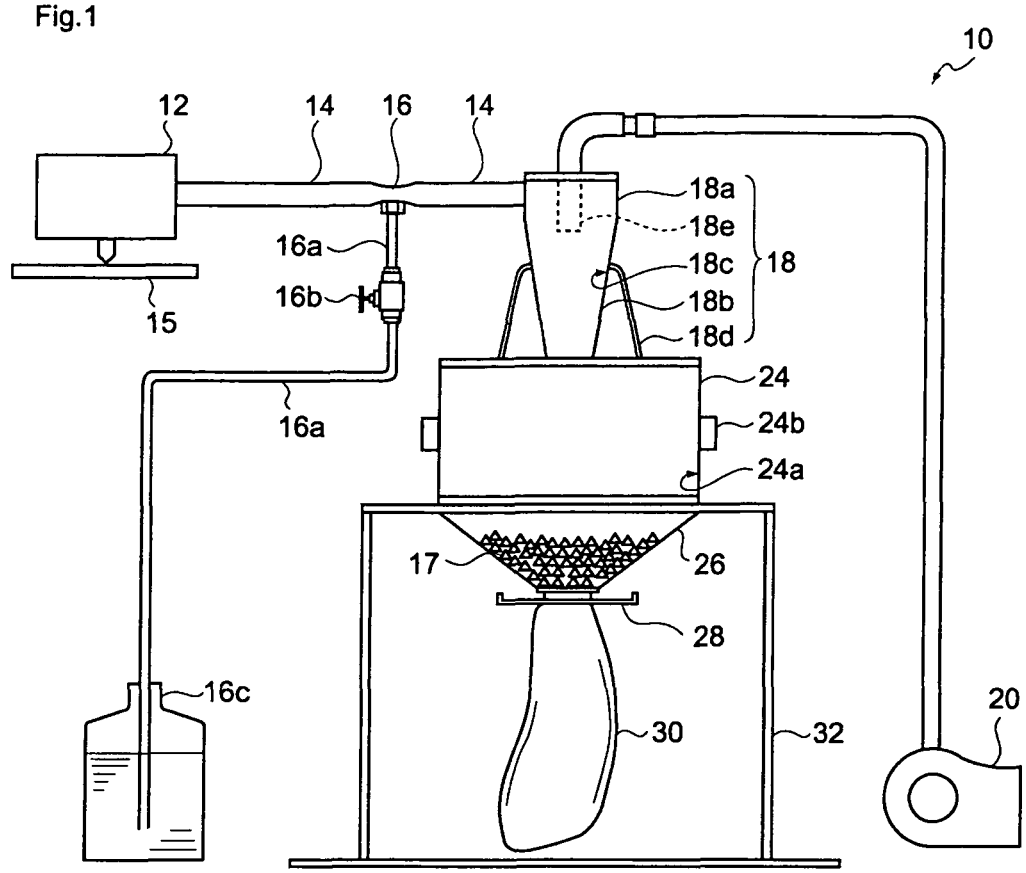
FIG. 1 is a schematic view for explaining waste collection equipment according to the present invention.
Figure 2:
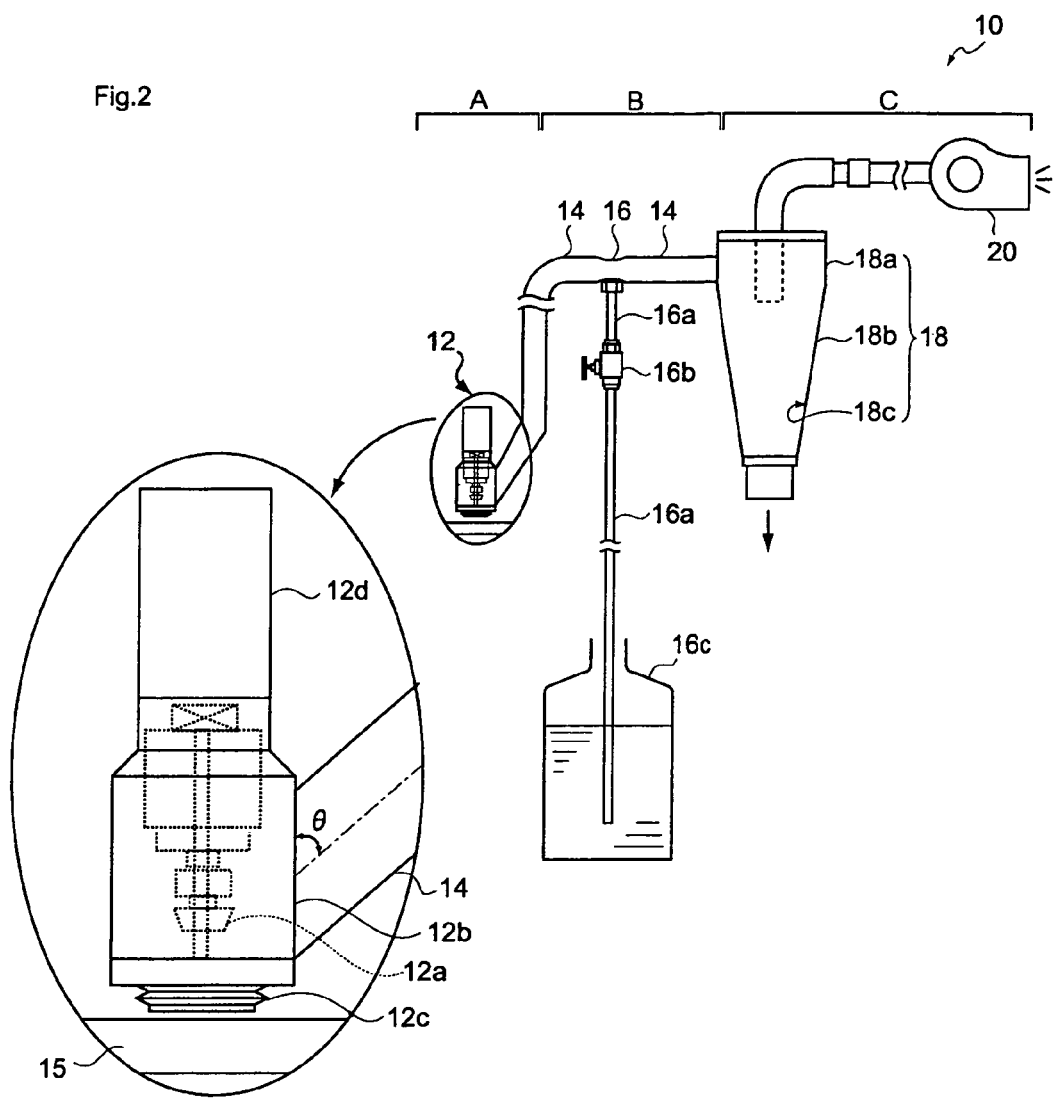
FIG. 2 is a partially enlarged view for explaining a part of a machining device according to the present invention.

In a first embodiment, as exemplified in FIGS. 1 and 2, a machining device 12 is provided. The machining device 12 is provided with waste collection equipment 10 collecting waste generated by a predetermined machining processing. The machining device 12 including the waste collection equipment 10 is characterized in that the waste collection equipment 10 is provided with a transfer path 14 through which waste is transferred by airflow, a water supply device 16 which is provided at an intermediate portion of the transfer path 14 and applies antistatic treatment to the waste by supplying a predetermined amount of water to the waste, a cyclone 18 which applies separation processing to the waste subjected to the antistatic treatment, and a collection tank 24 which collects waste subjected to the separation processing by the cyclone 18.

FIG. 1 is a schematic view of the waste collection equipment 10. FIG. 2 is a partially enlarged view of the machining device 12 including a part of the waste collection equipment 10.

A balloon in FIG. 2 shows an enlarged view of the machining device (cutting tool) 12. "A" represents a machine processing section for performing a predetermined machining processing. "B" represents a charging section for applying a predetermined charge treatment to waste. "C" represents a collection section for collecting waste.

Hereinafter, the machining device with waste collection equipment of the first embodiment will be described assuming, as a machining device provided in the machine processing section "A", an airbag fracture groove forming device for forming an airbag fracture groove (tear line) mainly to an automotive interior member (airbag door member).

1. Machining Device (1) Type

The type of the machining device (including a machinery tool) 12 exemplified in FIGS. 1 and 2 is not limited especially as long as it has a constitution in which waste is generated by a predetermined machining processing. However, the machining device may be at least one of a cutting device, a polishing device, a cutoff device, and a boring device, or these machining devices and other mechanical device such as an inspection device, a deposition device, a coating device, and a heating device may be combined.

The cutting device includes an end mill, a vibration cutting device (including an ultrasonic vibration cutting device, an elliptical vibration cutting device, and the like), and a rotating shaft cutting device. Especially most preferred cutting tool is a solid end mill having at its end a bottom blade and on its side a side blade. The polishing device includes a turning tool, a grinder, a blast, and a file. The cutoff device includes an ultrasonic cutter, a laser cutter, a thermal fusion blade, and the like. The boring device includes a drill (including a high-frequency ultrasonic drill), a reamer, a tap, and the like.

Figure 3A:
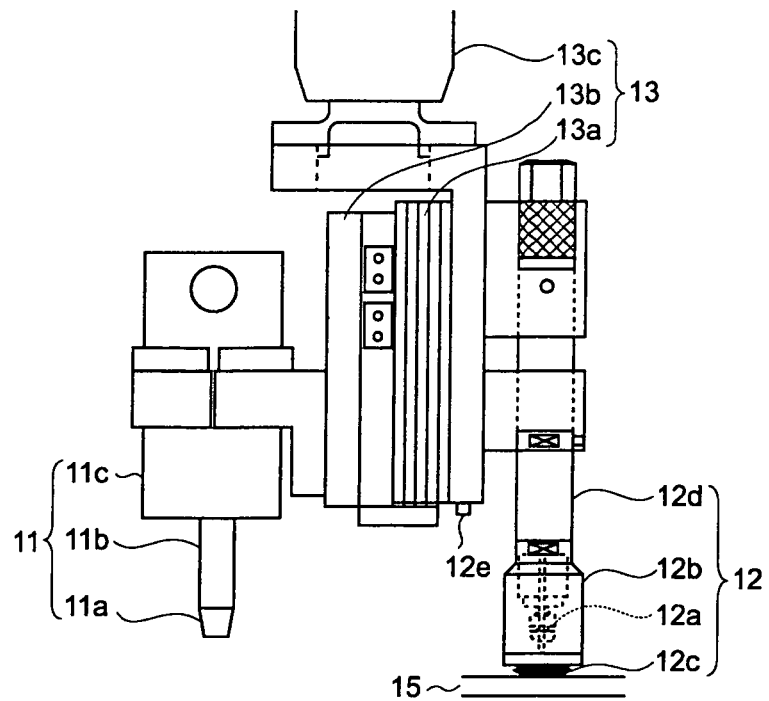
FIGS. 3A and 3B are views for schematically explaining an operation of the machining device provided with a cutting device (end mill) and a cutting device (ultrasonic cutter)
Figure 3B:
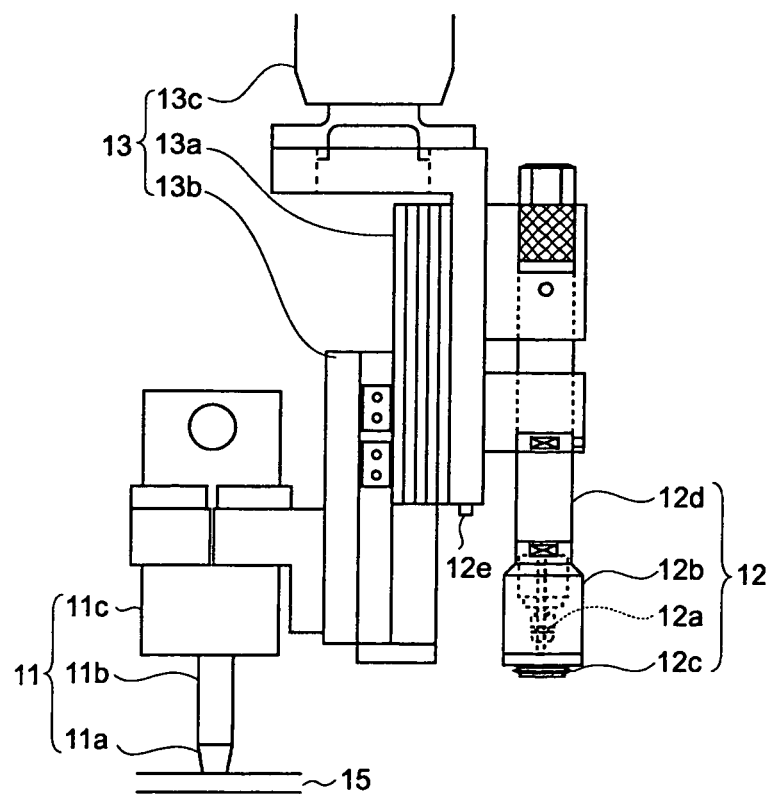

Accordingly, for example, when the machining device is the airbag fracture groove forming device, as shown in FIGS. 3A and 3B, the end mill 12 as a cutting device and the ultrasonic cutter 11 as a cutoff device are provided, whereby both the end mill 12 and the ultrasonic cutter 11 or one of them may be used according to a kind of a workpiece and intended use.

More specifically, as exemplified in FIG. 3A, the end mill 12 is used, and airbag fracture grooves having a rectangular cross-section can be continuously formed in a workpiece 15. Meanwhile, as shown in FIG. 3B, the ultrasonic cutter 11 is used, a plurality of cutoff portions may be provided, at predetermined intervals, indirectly to a bottom portion of the airbag fracture groove with a rectangular cross-section formed by the end mill 12 or directly to the workpiece 15.

FIG. 3A shows a machining state in which the end mill 12 is moved down to a lower position than a predetermined position by a position controller 13 (13a, 13b, 13c) for positioning in three-dimensional directions including vertical direction operation and rotating direction operation and a cylinder 12d continued from the position controller 13, and the airbag fracture grooves are continuously formed in the workpiece 15.

The ultrasonic cutter 11 provided on the opposite side of the end mill 12 through the position controller 13 is moved up to an upper position than a predetermined position so as not to inhibit the operation of the end mill 12.

Meanwhile, FIG. 3B shows a machining state in which the ultrasonic cutter 11 (11a, 11b, 11c) is moved down to a lower position than a predetermined position by the position controller 13, and the airbag fracture grooves are continuously formed in the workpiece 15.

The ultrasonic cutter 11 is constituted of an end portion 11a, a shaft portion 11b, and an ultrasonic vibration device 11c.

The end mill 12 provided on the opposite side of the ultrasonic cutter 11 through the position controller 13 is moved up to an upper position than a predetermined position so as not to inhibit the operation of the ultrasonic cutter 11.

It is preferable to selectively use the type of the machining device such as a cutting device, a polishing device, a cutoff device, and a boring device according to an aspect of a workpiece.

Figure 4A:
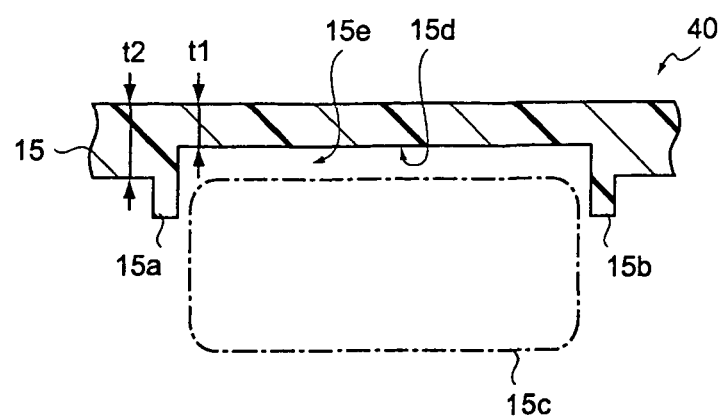
FIGS. 4A and 4B are views for explaining an aspect of an airbag device.

Namely, as shown in FIG. 4A, when an airbag door member 40 includes a single-layered base material 15 formed of such as a polypropylene resin or an ABS resin, while an airbag fracture groove 15d substantially constituted of a continuous line is formed in the base material 15, using only a cutting device (end mill), generated waste can be suctioned and removed.

Then, as shown in FIGS. 3A and 3B, the machining state (the depth of the fracture groove) of the base material 15 is monitored online by a laser displacement gauge 12e (for example, LKG-5000 Series from Keyence Corporation) to be fed back, whereby the depth of the fracture groove of the base material 15 can be adjusted within a predetermined range.

Thus, even when the continuous line is formed while the number of times of vertical movement is extremely reduced by the end mill, the airbag fracture groove can be formed quickly and highly accurately.

Consequently, as shown in FIG. 4A, it is possible to manufacture extremely inexpensively and efficiently the airbag door member 40 provided with an airbag storage portion 15e, which is constituted of an airbag 15c and a plurality of protrusions 15a and 15b, and the base material 15 having a predetermined thickness (t1) relative to the depth of the fracture groove 15d.

Figure 4B:
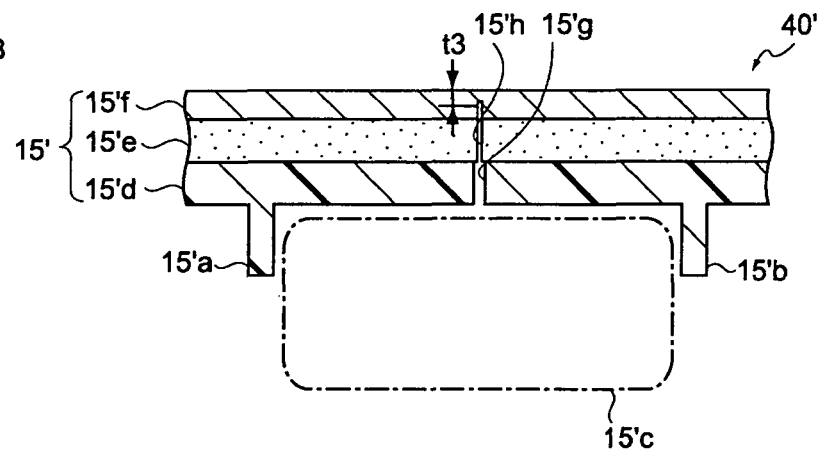

Meanwhile, as shown in FIG. 4B, when an airbag door member 40' includes a multilayered (trilaminar) base material 15' in which an outer skin 15'f formed of such as a polyvinyl chloride resin or a polyolefin resin is provided on a hard substrate 15'd, formed of such as a polypropylene resin or an ABS resin, through an urethane foam layer 15'e as an intermediate layer, a predetermined airbag fracture groove 15'g can be formed in the hard substrate 15'd, using an end mill as a cutting device.

Usually, the thickness of the hard substrate 15'd is within a range of 1 to 3 mm, the thickness of the urethane foam layer 15'e is within a range of 0.5 to 10 mm, and the thickness of the outer skin 15'f is within a range of 0.5 to 5 mm.

The intermediate layer 15'e and the outer skin 15'f are subjected to a cutoff processing using an ultrasonic cutter, and in order to increase invisibility, a plurality of cutoff portions 15'h having a predetermined remaining thickness (t3) can be provided in the intermediate layer 15'e and the outer skin 15'f.

Thus, as shown in FIG. 4B, a multiple breaking portion constituted of a combination of the airbag fracture groove 15'g and the plurality of cutoff portions 15'h is formed, whereby the airbag door member 40' excellent in invisibility and decorativeness can be manufactured efficiently.

The depth of the airbag fracture groove 15'g formed using an end mill can be measured using the laser displacement gauge 12e as shown in FIGS. 3A and B.

Figure 5:
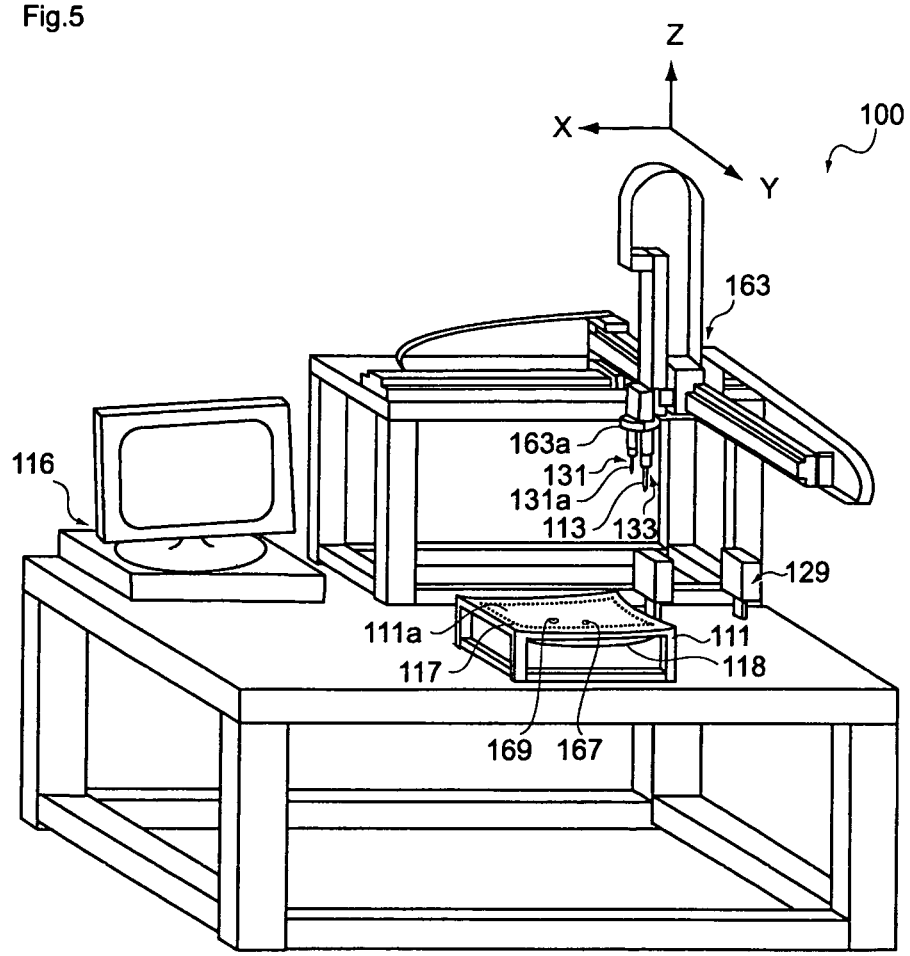
FIG. 5 is a view for schematically explaining an airbag fracture groove forming device.

The depth of the cutoff portion 15'h formed using an ultrasonic cutter can be measured with high accuracy, using eddy current measurement devices 167 and 169 shown in FIG. 5.

(2) Airbag Fracture Groove Forming Device

When the machining device is an airbag fracture groove forming device, for example, as shown in FIG. 5, an airbag fracture groove forming device 100 is provided with a support pedestal 111 on which an automotive interior member (airbag door member) is placed.

The airbag fracture groove forming device 100 is provided with primary break line forming means 131 and secondary break line forming means 133. The primary break line forming means 131 is used for forming a primary break line (for example, a fracture groove having a predetermined width and a predetermined depth) to the automotive interior member placed on the support pedestal 111. The secondary break line forming means 133 is used for forming a secondary break line (for example, a slit line having a predetermined depth).

First machining blade sensing means 167 and second machining blade sensing means 169 for detecting a position of a machining blade 113 attached to the primary and secondary break line forming means 131 and 133 are provided on the rear side of a placement surface 111a. The first and second machining blade sensing means 167 and 169 are usually eddy current measurement devices.

The airbag fracture groove forming device 100 further includes a controller (computer controller) 116 for use in highly accurately performing the positioning and machining processing operation of the primary and secondary break line forming means, sensing operation, and so on.

However, according to an aspect of an airbag door member, as described above, any one of the primary and secondary break line forming means may be used, or tertiary break line forming means may be provided in addition to the primary and secondary break line forming means.

(2)-1 Support Pedestal

The airbag fracture groove forming device 100 is provided with the support pedestal 111 on which an automotive interior member is placed and fixed when the airbag fracture groove is formed.

While the placement surface 111*a* of the support pedestal 111 has a plurality of suction holes 117, there is provided a suction device 118 for suctioning and fixing the automotive interior member, placed on the placement surface 111*a*, through the suction holes 117.

As the suction device 118, a vacuum pump may be used, for example. By virtue of the provision of the suction and fixing means, even a complex-shaped automotive interior member and a large-sized automotive interior member can be easily fixed onto the support pedestal 111.

Accordingly, a positional deviation of the automotive interior member in the formation of the airbag fracture groove and a variation in thickness of a remaining portion of the airbag fracture groove can be prevented, and the airbag fracture groove can be formed with high accuracy.

When a vacuum pump or the like is used, unlike mechanical fixing means, whether or not the automotive interior member is fixed can be easily switched by turning on/off the actuation of the suction device 118, and operation can be performed quickly.

(2)-2 Break Line Forming Means

As shown in FIG. 5, as the break line forming means, the primary break line forming means 131 and the secondary break line forming means 133 are preferably provided.

When a workpiece is an automotive interior member (airbag door member) constituted of only the hard base material 15 as shown in FIG. 4A, the primary break line forming means 131 is machining means (primary break line forming means) for cutting a part of the base material 15 having a predetermined thickness (t2) from the rear side of the base material 15 to form the airbag break line 15*d* having a predetermined thickness (t1) not reaching the front surface side of the base material 15.

The predetermined thickness (t2) of the base material 15 is usually within a range of 1.0 to 2.5 mm. Although the predetermined thickness (t1) of the remaining base material not reaching the front surface side is usually within a range of 0.1 to 0.8 mm, preferably 0.2 to 0.7 mm, and more preferably 0.3 to 0.6 mm.

Meanwhile, as shown in FIG. 4B, when the workpiece is the base material 15' constituted of three layers of the hard base material 15'*d*, the intermediate layer (urethane foam layer) 15'*e*, and the outer skin 15'*f*, the primary break line forming means 131 is machining means for forming the primary break line having a depth not reaching the outer skin 15'*f* while penetrating through the base material 15'*d* from the side of the hard base material 15'*d*.

A predetermined thickness (t3) of the remaining outer skin not reaching the front surface side is usually within a range of 0.1 to 0.8 mm, preferably 0.2 to 0.7 mm, and more preferably 0.3 to 0.6 mm.

As the primary break line forming means, an end mill, a thermal fusion blade, an ultrasonic cutter, a laser cutter, and the like can be suitably used.

Meanwhile, the airbag fracture groove forming device 100 shown in FIG. 5 is provided with the secondary break line forming means 133 as machining means for making the machining blade 113 enter through the inside of the primary break line and forming a secondary break line (with the thickness t3) reaching the outer skin 15'*f*.

Accordingly, the machining blade (such as an ultrasonic cutter) 113 included in the secondary break line forming means 133 is generally formed into an elongated plate shape and can enter into the primary break line formed by a machining blade (such as an end mill) included in the primary break line forming means 131.

The secondary break line forming means 133 includes as the machining blade 113 a non-heated type of knife-type cutter blade such as a cutter blade and a razor blade. The break line formed by the secondary break line forming means 133 is basically a single thin cutting line, and thus the secondary break line forming means 133 has a constitution in which very little waste is generated.

The secondary break line formed using the non-heated type of knife-type cutter blade has a small line width, and the cut surface is not melted or roughen. Therefore, even if the secondary break line is formed in a rear surface of an outer skin layer disposed on an outer surface of an interior member, the existence position of the airbag fracture groove is not recognized from outside, so that the invisibility can be secured.

However, as shown in FIG. 4A, basically in a case of an automotive interior member (airbag door member) including only the base material 15, the secondary break line forming means is not required to be used.

In the airbag fracture groove forming device 100, the primary break line forming means 131 and the secondary break line forming means 133 are fixed to a fixing portion 163*a* of break line forming means of a movement control robot 163.

Accordingly, when the primary break line is formed, the movement control robot 163 is operated, and while the hard base material 15'*d* is positioned by the primary break line forming means 131 so that the hard base material 15'*d* can be cut, a predetermined cutoff operation is performed.

Subsequently, when the secondary break line is formed, a predetermined cutoff operation is performed in such a state that the outer skin 15'*f* can be cut by the secondary break line forming means 133.

(2)-3 Machining Blade Sensing Means

In the airbag fracture groove forming device 100, a blade edge position according to the machining blade 131*a* constituting a part of the primary break line forming means 131 is controlled, and in order to adjust a depth of a groove to be formed, that is, a thickness of a remaining portion of a base material, it is preferable to provide an optical measurement device (laser displacement gauge of laser reflection type) for actually measuring a depth of the primary break line on time.

Meanwhile, it is preferable that the first blade sensing means 167 and the second blade sensing, means 169 for sensing the blade edge position of the machining blade constituting a part of the secondary break line forming means 133 are provided under the support pedestal 111.

The first and second blade sensing means 167 and 169 are disposed inside the support pedestal 111 and constituted so that whether or not the machining blade exists at a previously set specified detection position is sensed.

As the first and second blade sensing means 167 and 169, a metal detector is preferably used, for example, whereby when a metal machining blade passes through the detection position, the existence of the machining blade can be sensed.

(2)-4 Blade Edge State Sensing Means

Blade edge state sensing means 129 is a means for sensing the wear state and damage state of an edge of a machining blade.

Namely, a state of the edge of the machining blade is measured, and when damage of the blade edge due to wear and so on is sensed, the operation of the device is stopped, and, at the same time, the blade edge can be exchanged. Accordingly, the thickness of the remaining portion of the airbag fracture groove to be formed can be adjusted with high accuracy.

Specifically, the blade edge state sensing means is constituted using, for example, a laser displacement gauge and an infrared measuring device, and while the front end of the movement control robot 163 is maintained at a predetermined height, the machining blade is disposed at the sensing position of the blade edge state sensing means 129. A difference of the height position of the blade edge between before and after the formation of the airbag fracture groove and a difference of the shape of shade are measured, whereby a damage level according to wear and so on can be sensed.

By virtue of the provision of the blade edge state sensing means 129, a distance between the edge of the machining blade and the placement surface of the support pedestal 111 can be maintained in a constant state, considering the blade surface state of the machining blade. Even when a kind or a thickness of an outer skin is changed, the airbag fracture groove in which the thickness of a remaining portion is generally uniform can be formed highly accurately and quickly.

(3) A Workpiece

Although the kind of a workpiece is not limited especially, examples of the workpiece include a synthetic resin such as a polyethylene resin, a polypropylene resin, a polystyrene resin, a polyester resin, a polycarbonate resin, a polyurethane resin, a polyamide resin, a polyvinyl chloride resin, and a polysulfone resin, metal (including alloy) such as gold, silver, copper, platinum, nickel, titanium, aluminum, zinc, iron, lead, cadmium, tungsten, indium, and molybdenum, oxide such as silver oxide, copper oxide, silicon oxide, nickel oxide, titanium oxide, aluminum oxide, zinc oxide, iron oxide, lead oxide, cadmium oxide, tungsten oxide, indium oxide, molybdenum oxide, glass, and ceramic, hydroxide such as aluminum hydroxide, a ceramic material, and a sterically molded product and film composed of a composite or mixture of them.

When a predetermined machining processing is applied to the workpiece composed of the above synthetic resin or metal oxide, a large amount of waste is generated. However, the waste is characterized in that it is easily charged, and, at the same time, the size is considerably large.

Thus, when the machining state of a workpiece is measured by an optical measurement method, for example, if generated waste remains, the remaining waste causes inhibition of the measurement, so that it is difficult to manage the machining state of the workpiece. Thus, as in the present invention, it is important to quickly and satisfactorily suction and remove waste by a predetermined air flow simultaneously with the generation of the waste.

When the airbag fracture groove forming device is assumed as the machining device, the single-layered base material 15 constituting the automotive interior member (airbag door member) 40 exemplified in FIG. 4A or the multi-layered base material 15' constituting the automotive interior member (airbag door member) 40' exemplified in FIG. 4B is machined as a workpiece.

(4) Waste

Although waste generated from a workpiece by the machining processing is changed according to the kind and aspect of the workpiece or the type and aspect of the machining device, waste typically includes a cutting powder, cut waste, a polishing powder, polish waste, a boring powder, and boring waste.

Accordingly, when the airbag fracture groove forming device is assumed as the machining device, waste generated from a workpiece specifically includes waste may be formed of a polypropylene resin, a polyurethane resin, or a polyvinyl chloride resin and may have a circular, elliptical, polygonal, heteromorphic, or ribbon-like shape.

When the waste is collected using waste collection equipment, the average grain diameter (equivalent circular diameter or equivalent spherical diameter) of the waste is preferably within a range of 0.01 to 8 mm.

This reason is because if the average grain diameter of the waste is less than 0.01 mm, the conveying properties in a transfer path may be reduced, antistatic characteristics according to supply of a predetermined amount of water may be reduced, or handleability in a collection tank may be reduced.

Meanwhile, if the average grain diameter of the waste is more than 8 mm, the conveying properties may be reduced as above, the waste is less likely to pass through a water supply device such as a venturi tube, or the antistatic characteristics according to supply of a predetermined amount of water may be reduced.

Accordingly, the average grain diameter of the waste is preferably within a range of 0.01 to 5 mm, and more preferably 0.5 to 2 mm.

The average grain diameter of the waste can be adjusted to a value within a predetermined range by suitably controlling the conditions of the machining processing.

The average grain diameter of the waste is an average grain diameter measured in conformity with JIS Z 8901 and is defined as the equivalent circular diameter according to microscopy, the equivalent spherical diameter according to a light scattering method, the equivalent spherical diameter according to an electrical resistance test method, and so on.

More specifically, the average grain diameter of the waste is measured using well-known means such as a laser type particle counter, an image processing method through a microscope photograph, and a vernier caliper and can be calculated as an arithmetic mean value of a particle diameter in waste.

2. Waste Collection Equipment (1) Transfer Path

As shown in FIGS. 1 and 2, the transfer path 14 is a path for transferring waste using an air flow and usually constituted of a pipe-like object or a bellow-like object having a circular cross-section.

In order to smoothly transfer a large amount and a considerably large size of waste within a short time, the diameter of the transfer path is preferably 1 to 80 mm, more preferably 5 to 40 mm, and most preferably 10 to 20 mm.

(2) Water Supply Device

As shown in FIGS. 1 and 2, the water supply device 16 provided in the charging section B is provided at an intermediate portion of the transfer path 14 including a straight portion and a curved portion and is used for supplying a predetermined amount of water to waste transferred with the air flow.

Figure 6:
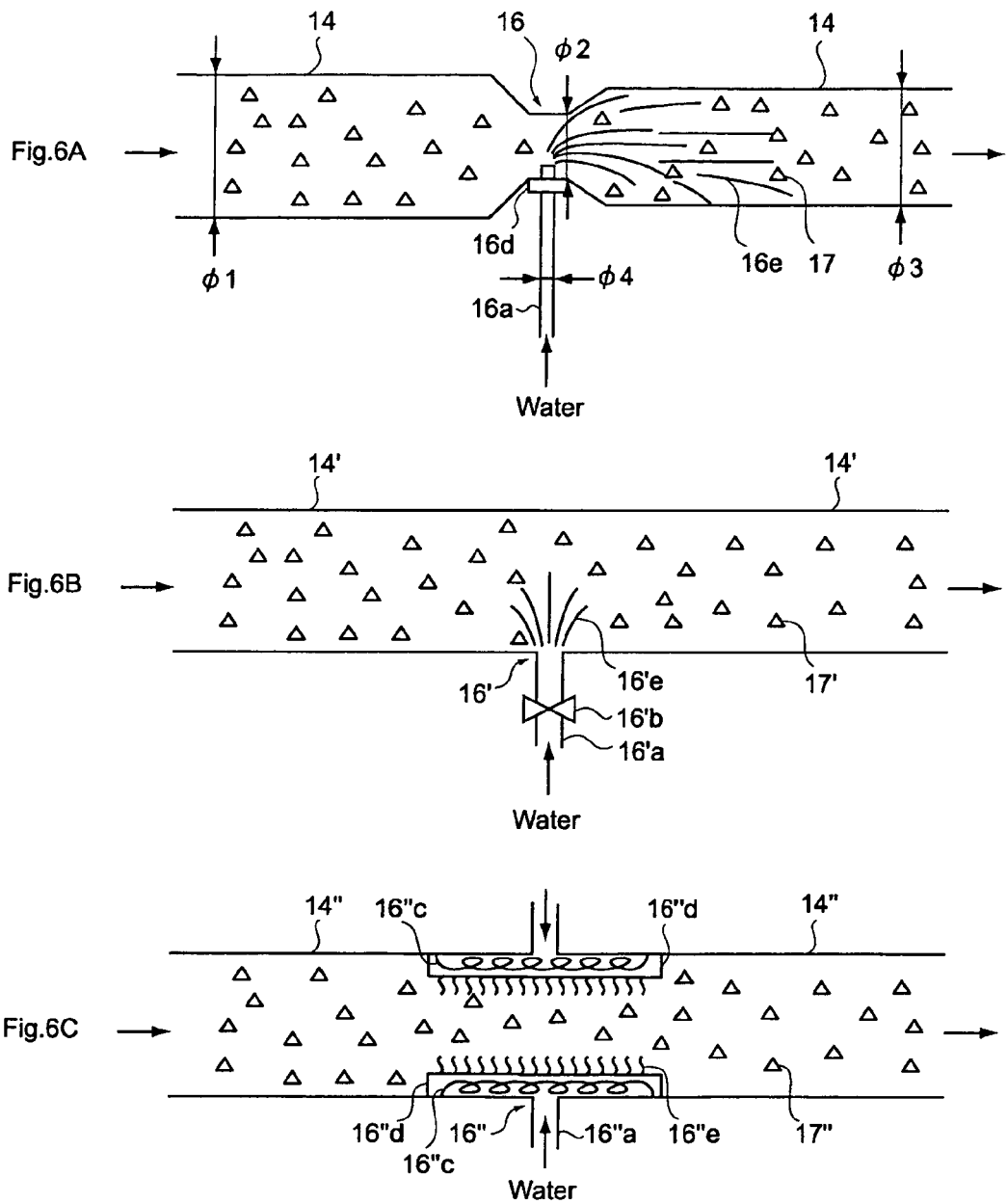
FIGS. 6A to 6C are views for explaining an aspect of a water supply device.
Figure 7:
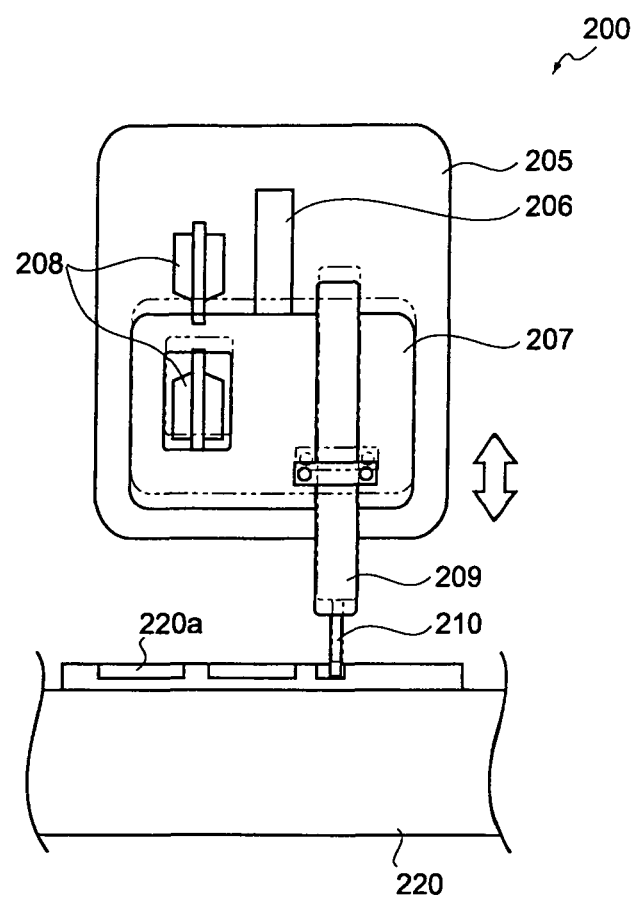
FIG. 7 is a view for explaining the related art airbag tear line forming device.
Figure 8:
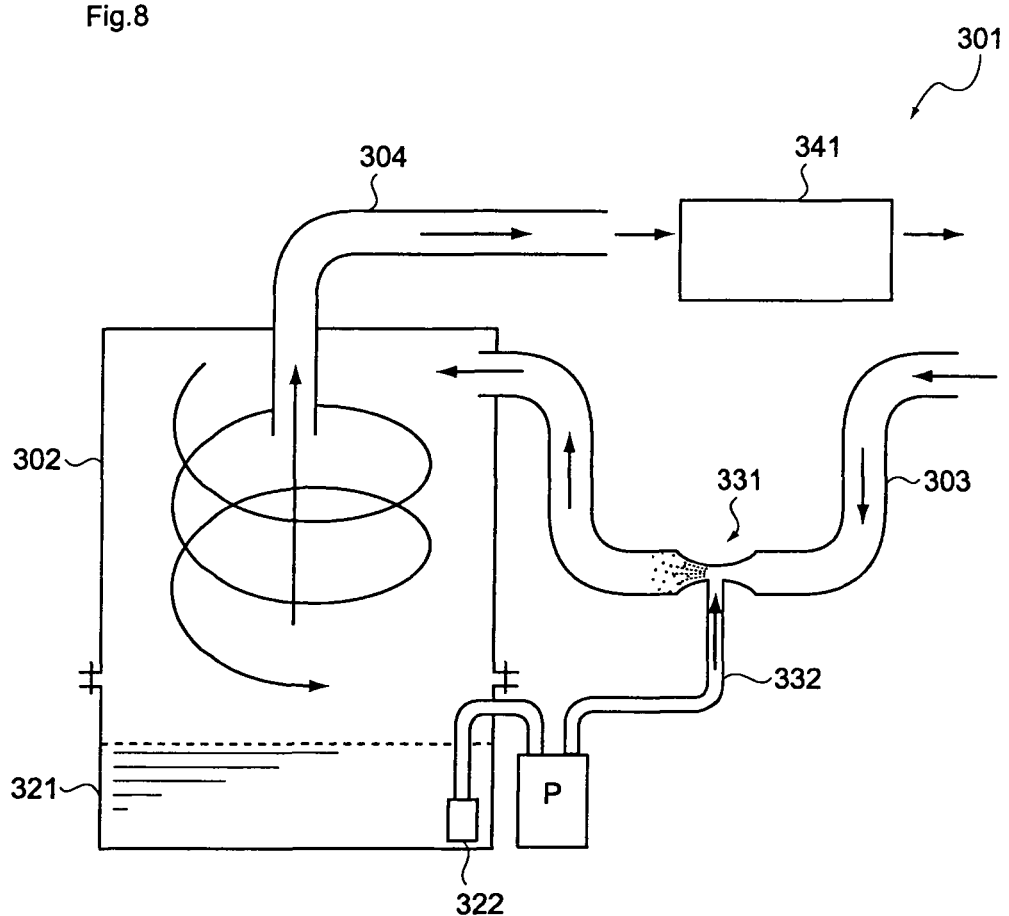
FIG. 8 is a view for explaining the related art dust collection and air purification equipment.
Figure 9:
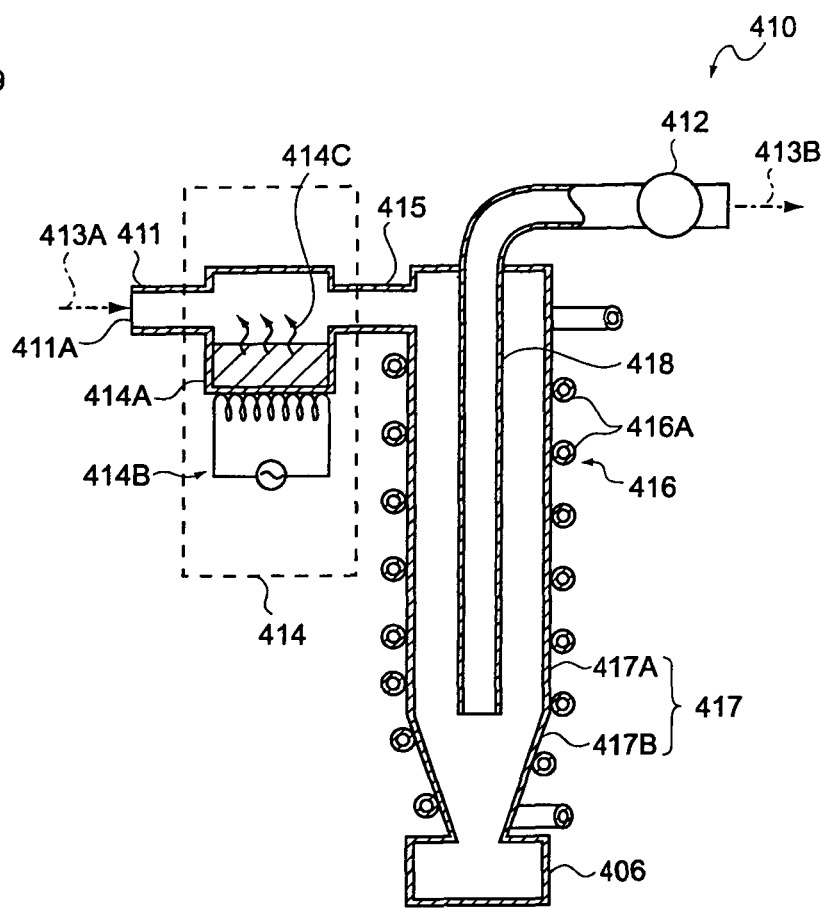
FIG. 9 is a view for explaining the related art dust collection device.
Figure 10:
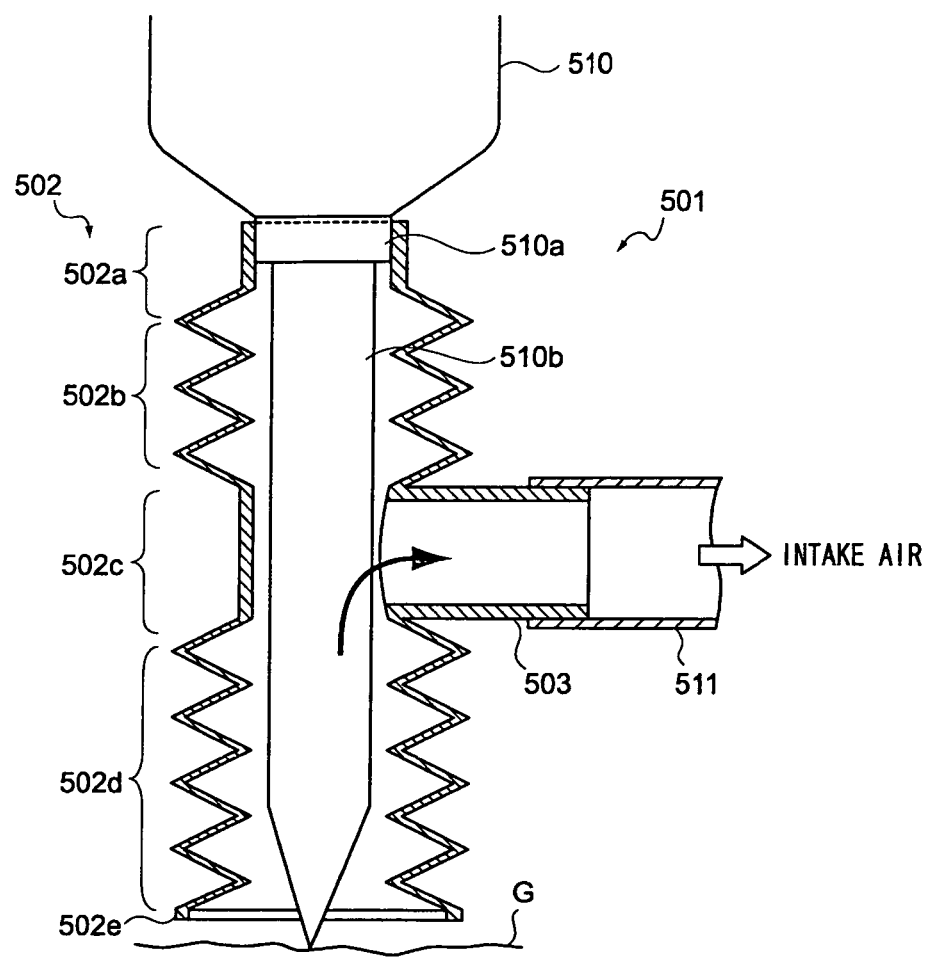
FIG. 10 is a view for explaining the related art dust collection attachment.

The water supply device 16 includes a venturi pipe of FIG. 6A, a T-tube of FIG. 6B, and an electric heating type of water vapor adder of FIG. 6C, or, although not illustrated, a spray device, a mist supply device, an ultrasonic type of water vapor adder, and a titrator.

More specifically, as shown in FIG. 6A, the water supply device is constituted of the venturi pipe 16 and a water introduction pipe 16a for supplying water into the venturi pipe 16. It is preferable that a predetermined amount of water 16e is supplied in a sprayed form from a front end portion of the water introduction pipe 16a to waste 17, utilizing a negative pressure generated when the air flow passes through the narrowest portion of the venturi pipe 16.

A diameter ($\phi$1) of the transfer path prior to the venturi pipe is for example 8 to 12 mm, a diameter ($\phi$2) of the narrowest portion of the venturi pipe is for example 3 to 7 mm, and a diameter ($\phi$3) of the transfer path subsequent to the venturi pipe is for example 8 to 12 mm.

As a preferred constitution, the Water introduction pipe 16a is connected to the lower portion of the narrowest portion of the venturi pipe 16 through a connection jig 16d, and the front end portion of the water introduction pipe 16a projects toward the inside of the venturi pipe 16 by approximately 1 to 3 mm. The flow rate of the air flow introduced into the venturi pipe 16 is for example within a range of 50 to 2000 m/min.

This reason is because, according to the above constitution, since a predetermined amount of water can be supplied without separately providing a special driving device, a simple device configuration can be realized, and, in addition, since water in a mist state can be supplied to waste quantitatively, antistatic treatment can be efficiently applied to the waste with a relatively small amount of water.

As shown in FIG. 6B, it is also preferable that the water supply device is a T-tube 16' provided at an intermediate portion of a transfer path 14'. Namely, the T-tube 16' forcibly supplies a predetermined amount of water 16'e from a pipe 16'a provided in a T-shape to a connecting portion at an intermediate portion of the transfer path 14' and applies a predetermined antistatic treatment to waste 17'.

A valve 16'b is provided at an intermediate portion of the pipe 16'a, and the amount of water supplied from the T-tube 16' via the pipe 16' and the valve 16'b is adjusted.

In a case of the T-tube 16', the pipe diameter of the transfer Path 14' does not affect substantially the water supply amount, and therefore, compared with other water supply device, there is an advantage that even if the waste 17' is a substantially large amount, the transfer path 14' is not likely to be clogged.

As shown in FIG. 6C, it is also preferable that the water supply device is an electric heating type of water vapor adder 16". Namely, in the water vapor adder 16", a water vapor evaporation portion 16"d including a heating device 16"c is provided at an intermediate portion of a transfer path 14". A predetermined amount of water is supplied to the water vapor evaporation portion 16" d through a pipe 16"a, and, at the same time, a predetermined amount of water 16'e is forcibly supplied from a surface of the water vapor evaporation portion 16"d.

In a case of the electric heating type of water vapor adder 16", compared with other water supply device, the water vapor evaporation portion 16"d can have a relatively large area, and there is an advantage that the antistatic treatment can be performed more uniformly and reliably regardless of the flow rate of the air flow.

Although not illustrated, as a part of the water supply device, a mixing part is preferably further provided at an intermediate portion of the transfer path so that water can be mixed and added to waste.

Namely, it is preferable that a small chamber or a baffle plate as the mixing part is provided at connecting positions between the venturi pipe, the T-tube, and the spray device and an introducing pipe or provided downstream from the connecting positions, and water is supplied to waste at the small chamber, the baffle plate, or the like.

In such a mixing part, a stirring device and a mixing device such as an ultrasonic vibrator are further provided, whereby water can be uniformly supplied to waste.

As shown in FIGS. 1 and 2, it is preferable to provide the valve (electromagnetic valve or manual valve) 16b at an intermediate portion of the water introduction pipe 16a connecting to the water supply device 16 or at an intermediate portion of the water introduction pipe 16a arranged between the water supply device 16 and the water tank 16c for supplying water to the water supply device 16.

This reason is because according to the above constitution, since the water supply amount in the water supply device can be controlled with higher accuracy, the antistatic treatment can be efficiently applied to waste with a relatively small amount of water.

By virtue of the provision of such a valve, since a predetermined amount of water can be previously stored in, for example, a water introduction pipe for supplying water into a venturi pipe, water is quickly supplied to waste, utilizing the stored water, and a predetermined antistatic treatment can be applied to the waste.

(3) Cyclone

As shown in FIGS. 1 and 2, the cyclone 18 is a device for applying separation processing to waste subjected to the antistatic treatment, utilizing a centrifugal force.

More specifically, as shown in FIG. 1, the cyclone 18 is constituted of a cylindrical portion 18a located upward, a conical portion 18b whose diameter is reduced downward, an air discharge pipe 18e for facilitating generation of a cyclonic flow in the cyclone 18, and, at the same time, discharging air outside after the separation processing for waste, and a blower 20 provided at a tail end of the air discharge pipe 18e and used for generating a predetermined air flow.

The cyclone 18 of FIG. 1 is placed on a collection tank 24 to be described later in a state of being fixed so as to be supported in an obliquely downward direction by a reinforcing member 18d.

Accordingly, as a preferred aspect of the cyclone, usually, the diameter of the cylindrical portion is 100 to 1000 mm, the height of the cylindrical portion is 100 to 800 mm, the diameter in the front end portion (the lowermost portion) in the conical portion is 50 to 500 mm, and the height in the front end portion in the conical portion is 200 to 2000 mm.

Namely, since the waste subjected to the antistatic treatment is rotated and moved by the cyclonic flow generated by the operation of the blower, a predetermined centrifugal force acts to facilitate adhesion of the waste to an inner wall of the cylindrical portion or the conical portion. When the amount of adhesion of the waste increases with the passage of the time, a predetermined cluster of waste is formed. The cluster of waste is dropped downward by its own weight to be accumulated in a lower portion of the conical portion.

At that time, in a case of waste not subjected to the antistatic treatment, the time when the waste adheres to the inner wall of the cylindrical portion or the conical portion is significantly increased, and, furthermore, so that a considerable time is required for the waste to drop to the lower portion of the conical portion by its own weight.

On the other hand, as in the present invention, in the case of the waste subject to the antistatic treatment, the weight is increased by the influence of added water, and an acting centrifugal force is increased. In addition, the time of the adhesion of the waste to the inner wall of the cylindrical portion or the conical portion is significantly reduced, so that the waste can be quickly accumulated in the lower portion of the conical portion.

(4) Collection Tank

As shown in FIG. 1, the collection tank 24 is a device for collecting waste subjected to the separation processing by the cyclone 18.

More specifically, the collection tank is a vessel having a substantially cylindrical shape. As a preferred aspect, the diameter of the collection tank is 300 to 2000 mm, and the height is 300 to 2000 mm.

As with the cyclone, also in the collection tank 24, a conical portion 26 whose diameter is reduced downward is provided, whereby waste can be more easily collected.

In a case of the waste not subjected to the antistatic treatment, the waste selectively adheres to an inner wall of the collection tank due to static electricity. Even if a transparent window portion to be described later is provided, the window portion is blocked visually, so that the collection amount of waste cannot be grasped, and, in addition, there is a problem that when the waste is to be removed outside from the collection tank, the waste cannot be easily removed.

On the other hand, as in the present invention, the waste subjected to the antistatic treatment is uniformly accumulated in the entire collection tank, and the total capacity of the collection tank can be utilized effectively. Moreover, by virtue of the provision of the transparent window portion, the collection amount and collection state of the collected waste can be confirmed visually, and, in addition, the waste can be easily removed outside.

It is preferable that the collection tank has a transparent window portion (not shown), and the collection state of waste can be confirmed visually.

This reason is because according to the above constitution, the waste collection level in the collection tank can be confirmed visually, and the waste collection period and so on can be easily judged.

In the collection tank, when the transparent window portion is provided, a slit-like transparent window portion having a width of 10 to 100 mm and a length of 500 to 2000 mm may be provided at a part of the collection tank. However, as shown in FIG. 1, it is preferable that the entire collection tank is constituted of a transparent resin, and not only the collection amount of waste collected in the collection tank but also the collection state can be confirmed visually.

As shown in FIG. 1, when the collection tank 24 is a first collection part, it is preferable that a second collection part 30 protected by a frame 32 and used for collecting waste is provided under the first collection part through a shutter 28.

In the second collection part 30, it is preferable that a collection bag or a collection box is provided, and when the shutter 28 is opened, waste dropped by its own weight is integrally collected in the collection bag or the collection box.

This reason is because according to the above constitution, a predetermined amount of waste can be integrally and quickly collected even in a simple constitution.

For the sake of the antistatic treatment, when an excessive amount of water is supplied to waste, or when waste is desired to be collected in a further dried state while having a suitable amount of water, a predetermined amount of water contained in the waste may be removed by a drier (including such as a heating device) 24b provided in the collection tank 24.

Alternatively, the blower 20 is rotated in a backward direction, and a predetermined amount of air is introduced into the collection tank 24 through the cyclone 18, whereby a predetermined amount of water contained in the waste may be removed.

Second Embodiment

The second embodiment provides a machining method for a workpiece using a machining device with waste collection equipment, and the machining method is characterized by including the following processes (1) to (5):

(1) a process of applying machining processing to a workpiece while suctioning and removing waste by using a machining device;
(2) a transfer process of transferring the waste in a transfer path, using an air flow;
(3) an antistatic treatment process of supplying a predetermined amount of water to the waste by a water supply device provided at an intermediate portion of the transfer path;
(4) a separation processing process of applying separation processing to the waste, subjected to antistatic treatment, by means of a cyclone; and
(5) a process of collecting the waste, subjected to the separation processing by the cyclone, in a collection tank.

Hereinafter, the machining method for a workpiece of the second embodiment will be described taking as an example an airbag fracture groove forming method.

1. Process (1)

The process (1) is a process of applying machining processing to a workpiece while suctioning and removing waste of the workpiece by using a predetermined machining device.

Namely, as shown in FIG. 2, the process (1) is a process of continuously applying the machining processing to a workpiece 15 while suctioning and removing waste of the workpiece 15 generated by machining processing performed using a predetermined machining device 12.

In order to quickly and satisfactorily suction waste of a workpiece, the flow rate of an air flow for suctioning and removing the waste is preferably within a range of 50 to 2000 m/min.

However, in order to quickly and satisfactorily suction waste of a workpiece while a predetermined machining processing is performed, as shown in the enlarged view of FIG. 2, it is preferable that a tubular cover 12b connected to a suction and removal portion 14 is provided around a cutting tool 12a, and a cushion portion 12c constituted of a bellows member is further provided at a front end portion of the tubular cover 12b.

This reason is because the tubular cover 12b is provided, and, at the same time, inner air is suctioned by the suction and removal portion 14, whereby a negative pressure is generated, so that generated waste is not scattered around the area, and, at the same time, can be suctioned in a concentrated manner.

Although the cutting tool 12a is required to move quickly with respect to a workpiece, when the cutting tool 12a is covered by the tubular cover 12b including the cushion portion 12c provided at the front end portion and constituted of the bellows member, the tubular cover 12b is suitably and flexibly deformed in only vertical direction, and the movement of the cutting tool 12a is not likely to be hindered.

As shown in FIG. 2, it is preferable that the suction and removal portion 14 is connected to the tubular cover 12b in a state of being inclined at a predetermined angle ($\theta$) to a vertical direction.

More specifically, the angle ($\theta$) formed by the center line of the suction and removal portion 14 and the vertical direction is preferably within a range of 10° to 80°, more preferably 20° to 70°, and most preferably 30° to 60°.

This reason is because by virtue of the provision of such a suction and removal portion inclined obliquely, a dead space in the tubular cover is reduced, and generated waste can be suctioned more quickly and satisfactorily.

2. Process (2)

Subsequently, in the process (2), waste is transferred in a transfer path 14 shown in FIGS. 1 and 2 from the cutting tool 12a to a cyclone 18 through a water supply device 16, using a predetermined air flow.

The flow rate of the air flow for transferring waste in the transfer path 14 shown in FIGS. 1 and 2 is preferably within a range of 50 to 2000 m/min.

This reason is because if the flow rate of the air flow is less than 50 m/min, it may be difficult to reliably suction and smoothly transfer a large amount of waste.

Meanwhile, if the flow rate of the air flow is more than 2000 m/min, it may be difficult to reliably apply the antistatic treatment to a large amount and a considerably large size of waste. Accordingly, the flow rate of the air flow in the transfer path is more preferably within a range of 100 to 1000 m/min, and most preferably 300 to 800 m/min.

In order to accurately control the flow rate of the air flow in the transfer path to a value within a predetermined range, it is preferable that the capacity and discharge amount of a blower for generating the air flow are suitably adjusted, or a current meter, a flowmeter, or a pressure meter is provided at a predetermined position in the transfer path.

3. Process (3)

Subsequently, in the process (3), the antistatic treatment in which a predetermined amount of water is supplied to waste is applied to waste by the water supply device 16 provided at an intermediate portion of the transfer path 14 shown in FIGS. 1 and 2.

Here, there is problem that a volume resistance in waste before the antistatic treatment is usually more than $1 \times 10^8$ Ω·cm, and the waste easily adheres to an inner wall of a cyclone and an inner wall of a collection tank by static electricity.

On the other hand, it is preferable that a predetermined antistatic treatment is applied to the waste, whereby the volume resistance is $1 \times 10^6$ Ω·cm or less.

This reason is because the antistatic treatment is applied to the waste quantitatively, whereby the level of the antistatic treatment to the waste and the water supply amount can be managed quantitatively.

Namely, when the volume resistance of the waste after the antistatic treatment is $1 \times 10^6$ Ω·cm or less, the generation amount of static electricity is significantly reduced, and it is possible to effectively prevent the waste from adhering to the inner wall of the cyclone and the inner wall of the collection tank, so that the waste collection efficiency can be increased.

However, if the volume resistance of waste is to be excessively reduced, the amount of water to be supplied to waste may be excessively increased, or the antistatic treatment time may be excessively increased.

Accordingly, a predetermined antistatic treatment is applied to waste, whereby the volume resistance of waste, after the antistatic treatment is more preferably within a range of $1 \times 10^0$ to $1 \times 10^5$ Ω·cm, and most preferably $1 \times 10^1$ to $1 \times 10^4$ Ω·cm.

The value of the volume resistance of waste can be measured by suitably sampling waste front and behind the transfer path in which the antistatic treatment is performed; however, in order to control the value more quickly and simply, it is preferable that a volume resistance measuring device is provided front and behind the transfer path in which the antistatic treatment is performed, and the value of the volume resistance of waste before and after the antistatic treatment is measured.

When the antistatic treatment is applied to waste using the water supply device, the amount of water to be supplied to the waste is preferably within a range of 0.001 to 500 g per a unit area ($m^3$) of an air flow containing waste.

This reason is because if the water amount is less than 0.001 g, sufficient antistatic treatment is not applied to waste, and it may be difficult to collect the waste simply and efficiently.

Meanwhile, if the water amount is more than 500 g, the amount of water contained in waste is excessively increased, and the waste is in a slurry state in a collection tank, so that it may be difficult to collect the waste simply and efficiently.

Accordingly, the amount of water to be supplied to waste is preferably within a range of 0.05 to 100 g per the unit area ($m^3$) of the air flow containing waste, more preferably 0.01 to 50 g; and most preferably 0.05 to 10 g.

When the antistatic treatment is applied to waste using the water supply device, it is preferable that the water supply (the antistatic treatment) and the machining processing performed by a predetermined machining device are performed in synchronism with each other.

Namely, it is preferable that the antistatic treatment is applied to waste according to the machining processing performed by a predetermined machining device.

According to the above constitution, by virtue of a predetermined suction processing, the accuracy of the machining processing by a machining device can be enhanced, and, at the same time, water can be supplied efficiently. Namely, if water is supplied constantly, excess water exists in a collection tank, and waste is in a slurry state, so that is may be difficult to collect the waste simply and efficiently.

4. Process (4)

Subsequently, in the process (4), the waste subjected to the antistatic treatment is subjected to the separation processing by the cyclone 18 shown in FIGS. 1 and 2, utilizing a centrifugal force acting on the waste subjected to the antistatic treatment.

Namely, when the waste subjected to the antistatic treatment is rotated and moved by a cyclonic flow generated by the operation of a blower, a predetermined centrifugal force is generated, and then a predetermined amount of water is supplied. When the waste has been subjected to the antistatic treatment, the weight of the waste is increased by the influence of the supplied water, and the acting centrifugal force is increased. In addition, the time of adhesion of the waste to the inner wall of the cylindrical portion or the conical portion is significantly reduced, so that the waste is quickly accumulated in a lower portion of the conical portion.

On the other hand, if the antistatic treatment is not applied to the waste, although the waste is rotated and moved by the cyclonic flow, static electricity is easily generated, and the waste easily adheres to the inner wall of the cyclone. In the case of the waste not subjected to the antistatic treatment, the time of adhering to the inner wall is significantly increased, and, furthermore, so that a considerable time is required for the waste to drop to the lower portion of the conical portion by its own weight.

Although the magnitude and so on of the cyclonic flow generated in a cyclone is not limited especially, it is only necessary that the cyclone having the aspect described in the first embodiment is used, for example, and, at the same time, a blower with a discharge air volume of 0.01 to 100 $m^3$/min and a discharge pressure of 0.1 to 100 kPa is combined with the cyclone under rated conditions of a three phase and 200 V, for example.

5. Process (5)

Subsequently, in the process (5), as shown in FIG. 1, the waste subjected to the separation processing by the cyclone 18 is collected in the collection tank 24.

Namely, if the waste has been subjected to the antistatic treatment, the waste is uniformly accumulated in the entire collection tank, and the total capacity of the collection tank can be utilized effectively. Moreover, by virtue of the provision of the transparent window portion, the collection amount and collection state of the collected waste can be confirmed visually, and, in addition, the waste can be easily removed outside.

On the other hand, in the case of the waste not subjected to the antistatic treatment, the waste selectively adheres to an inner wall of the collection tank due to generated static electricity. Even if a transparent window portion to be described later is provided, the window portion is blocked visually, so that the collection amount of waste cannot be grasped.

Moreover, there is a problem that when the waste is to be removed outside from the collection tank, the waste stays in the collection tank or easily adheres to a hand of a handling person due to generated static electricity, and thus the waste cannot be easily removed.

EXAMPLES

Example 1

1. Formation of Fracture Groove for Airbag

A machining device (end mill) 12, as shown in FIGS. 1 and 2, provided with predetermined waste collection equipment 18 including an antistatic treatment device 16 is used, and a predetermined fracture groove for an airbag is formed in a single-layered base material for an airbag.

Namely, a blower connected to a cyclone is operated, and while generated waste is suctioned and removed with an air flow with a flow rate of 40 m/min, a fracture groove for an airbag with a depth of 1.5 mm, a width of 5 mm, and a length of 25 cm is formed in a base material for an airbag (formed of a polypropylene resin and having a thickness of 2.0 mm) so as to have a shape of a Chinese character "日".

2. Antistatic Treatment

Subsequently, as shown in FIGS. 1 and 2, the suctioned and removed waste (not shown) is transferred in a flexible transfer path 14 with a diameter of 10 mm, using an air flow with a flow rate of 40 m/min.

Subsequently, an electromagnetic valve 16b of a water introduction pipe 16a is opened. A predetermined amount (about 10 cm$^3$) of water is supplied for about 15 seconds from the water supply device (venturi pipe) 16 provided at an intermediate portion of the flexible transfer path 14, and the antistatic treatment is applied to the waste.

3. Collection Processing

Subsequently, as shown in FIGS. 1 and 2, the waste introduced into the cyclone 18 is subjected to the separation processing by a cyclonic flow to be collected in a transparent collection tank 24 formed of a polymethyl methacrylate resin.

4. Evaluation

It is confirmed that the waste subjected to the antistatic treatment is quickly accumulated in a conical bottom portion 26 of the transparent collection tank 24 without adhering to an inner wall 18c of the cyclone 18 and an inner wall 24a of the transparent collection tank 24.

It is further confirmed that when an operator removes the accumulated waste with bear hands, static electricity is not generated, so that the waste is extremely easily separated from the hands of the operator, and the waste can be collected in a cluster in a plastic bag provided externally.

When the volume resistance of the waste is measured using a digital volt meter, it is confirmed that although the volume resistance before the antistatic treatment is $1\times10^8$ Ω·cm or more, the volume resistance after the antistatic treatment is $1\times10^3$ Ω·cm or less.

It is further confirmed that during the formation of the airbag fracture groove in the base material for an airbag, monitoring can be performed online using a laser displacement gauge, and in addition it is confirmed by microscope photograph measurement and vernier caliper measurement that the depth of the formed airbag fracture groove is within a range of 1.5 mm±0.2 mm, the width is within a range of 5 mm±0.2 mm, and the length is within a range of 25 cm±0.2 mm.

Example 2

In an example 2, in the antistatic treatment, the fracture groove for an airbag is formed as in the example 1 except that after an electromagnetic valve of a water introduction pipe is opened, a predetermined amount (about 13 cm$^3$) of water is supplied for about 20 seconds by a venturi pipe, and waste and so on are evaluated.

Consequently, it is confirmed that waste subjected to the antistatic treatment is quickly accumulated in a conical bottom portion of a transparent collection tank without adhering to an inner wall of a cyclone and an inner wall of the transparent collection tank.

It is further confirmed that when an operator removes the accumulated waste with bear hands, static electricity is not generated, so that the waste is extremely easily separated from the hands of the operator, and the waste can be collected in a cluster in a bag provided externally.

When the volume resistance of the waste is measured using a digital volt meter, it is confirmed that although the volume resistance before the antistatic treatment is $1\times10^8$ Ω·cm or more, the volume resistance after the antistatic treatment is $1\times10^2$ Ω·cm or less.

It is further confirmed that during the formation in the base material for an airbag, the depth of a fracture groove can be monitored online using a laser displacement gauge, and in addition it is confirmed by microscope photograph measurement and vernier caliper measurement that the depth of the fracture groove formed in the base material for an airbag is within a range of 1.5 mm±0.2 mm, the width is within a range of 5 mm±0.2 mm, and the length is within a range of 25 cm±0.2 mm.

Comparative Example 1

In a comparative example 1, the fracture groove for an airbag is formed as in the example 1 except that the antistatic treatment in the example 1 is not performed, and waste and so on are evaluated.

Consequently, it is confirmed that waste not subjected to the antistatic treatment adheres to an inner wall of a cyclone and an inner wall of a transparent collection tank, so that the inside cannot be observed visually, and, in addition, the waste is not quickly accumulated in a conical bottom portion of the transparent collection tank.

It is further confirmed that when an operator removes the waste with bear hands, static electricity is generated, and the waste adheres to the hands and the inner wall, so that all the waste cannot be satisfactorily collected in a bag provided externally.

When the volume resistance of the waste is measured using a digital volt meter, it is confirmed that the volume resistance of the waste before the antistatic treatment is $1 \times 10^8$ Ω·cm or more, and the volume resistance of the collected waste is $1 \times 10^{10}$ Ω·cm.

It is further conformed that during the formation in the base material for an airbag, the depth of a fracture groove cannot be monitored online using a laser displacement gauge and in addition it is confirmed that the depth of the fracture groove measured by a microscope photograph and a vernier caliper significantly varies within a range of 1.5 mm±0.8 mm, the width significantly varies within a range of 5 mm±0.5 mm, and the length significantly varies within a range of 25 cm±1 mm.

INDUSTRIAL APPLICABILITY

According to the machining device with waste collection equipment of this invention, by virtue of the provision of the waste collection equipment for collecting waste generated in large numbers by a predetermined machining processing, easily charged, and having a considerably large size while applying a predetermined antistatic treatment to the waste, the waste can be collected simply and efficiently, and, at the same time, the machining state of a workpiece in the machining processing can be quickly and highly accurately managed using an optical measurement device and so on.

Especially, in the related art, when a predetermined antistatic treatment is not applied to waste constituted of a synthetic resin, because the waste is easily charged and has a small specific gravity, the waste adheres to an inner wall of a collection tank, for example, and thus the collection processing is extremely difficult. However, as in the present invention, the waste collection equipment including an antistatic treatment device is provided to collect the waste, whereby the waste can be collected simply and efficiently.

In the related art, when waste is constituted of a metal powder and a carbon powder, dust explosion may occur due to slight electrostatic charges. However, as in the present invention, the waste collection equipment including the antistatic treatment device is provided to collect the waste, whereby such a dust explosion can be prevented effectively.

Meanwhile, according to the machining method for a workpiece using a machining device with waste collection equipment of this invention, the machining accuracy to the workpiece is high, and, in addition, waste generated in large numbers, easily charged, and having a considerably large size can be collected simply and efficiently. At the same time, the machining state of a workpiece in the machining processing can be quickly and highly accurately managed using an optical measurement device and so on.

Thus, according to this invention, in an airbag fracture groove forming device and an airbag fracture groove forming method executed by the airbag fracture groove forming device, while an airbag fracture groove and so on are formed with high accuracy, a predetermined antistatic treatment is applied to generated waste, so that the waste can be collected efficiently.

EXPLANATION OF INDICIA

10: Waste collection equipment, 12: Machining device, 12*a*: Cutting tool (end mill), 12*b*: Tubular cover, 12*c*: Cushion portion, 12*d*: Cylinder portion, 12*e*: Optical measurement device (laser displacement gauge), 13: Position controller, 14: Transfer path, 15: Workpiece (base material), 15': Workpiece, 15'*d*: Hard base material, 15'*e*: Intermediate layer, 15'*f*: Outer skin, 16: Water supply device (venturi pipe), 16*a*: Water introduction pipe, 16*b*: Valve, 16*c*: Water tank, 16*d*: connection jig, 17: Waste, 18: Cyclone, 18*a*: Cylindrical portion, 18*b*: Conical portion, 18*c*: Inner wall, 18*d*: Reinforcing member, 18*e*: Air discharge pipe, 20: Blower, 24: Collection tank (first collection part), 24*a*: Inner wall, 26: Conical portion, 28: Shutter, 30: Second collection part, 32: Frame, 40: Airbag door member including single-layered base material, 40': Airbag door member including trilaminar base material, 100: Airbag fracture groove forming device, 111: Support pedestal, 111*a*: Placement surface, 113: Machining blade, 113*a*: Blade edge, 116: Movement controller, 117: Suction hole, 118: Suction device, 129: State sensing means, 131: Primary break line forming means (end mill), 133: Secondary break line forming means, 163: Movement control robot, 167: First machining blade sensing means, 169: Second machining blade sensing means

What is claimed is:

1. A machining method for a workpiece using a machining device with waste collection equipment, which collects waste generated by a predetermined machining processing, comprising:
    a step of applying machining processing to the workpiece while suctioning and removing the waste by using the machining device;
    a transfer step of transferring the waste in a transfer path, using an air flow;
    an antistatic treatment step of supplying a predetermined amount of water to the waste having a volume resistance of $1 \times 10^8$ Ω·cm or more by a water supply device provided at an intermediate portion of the transfer path, wherein the volume resistance after the antistatic treatment in the waste is $1 \times 10^6$ Ω·cm or less;
    a separation processing step of applying separation processing to the waste, subjected to antistatic treatment, by means of a cyclone; and
    a step of collecting the waste, subjected to the separation processing by the cyclone, in a collection tank.

2. The machining method for a workpiece according to claim 1, wherein the water supply device is constituted of a venturi pipe and a water introduction pipe supplying water into the venturi pipe, and supplies the predetermined amount of water through the water introduction pipe by utilizing a negative pressure generated when the air flow passes through the venturi pipe.

3. The machining method for a workpiece according to claim 2, further comprising a step of providing an electromagnetic valve or a manual valve at an intermediate portion of the water introduction pipe.

4. The machining method for a workpiece according to claim 1, wherein the machining device is a cutting device or a polishing device, and after waste generated by the machining device is subjected to the separation processing in the cyclone, the waste is collected in the collection tank.

5. The machining method for a workpiece according to claim 1, wherein the collection tank having a transparent window portion is used for visually confirming a waste collection state.

6. The machining method for a workpiece according to claim 1, wherein an average grain diameter of the waste is in a range of 0.1 to 8 mm.

7. The machining method for a workpiece according to claim 1, wherein the collection tank includes a first collection part, and a second collection part under the first collection part through a shutter, and when the shutter is opened, the waste is dropped by a weight thereof and is collected in the second collection part.

\* \* \* \* \*